United States Patent
Jordan, Sr.

[11] Patent Number: 5,540,757
[45] Date of Patent: Jul. 30, 1996

[54] METHOD FOR PRECONDITIONING ADSORBENT

[75] Inventor: John F. Jordan, Sr., Louisville, Ky.

[73] Assignee: Jordan Holding Company, Fisherville, Ky.

[21] Appl. No.: 440,806

[22] Filed: May 15, 1995

[51] Int. Cl.⁶ ............................................. B01D 53/04
[52] U.S. Cl. .................... 95/93; 95/104; 95/107; 95/146
[58] Field of Search .................... 95/90, 92–95, 95/104–107, 141–146, 148

[56] References Cited

U.S. PATENT DOCUMENTS

| | | | |
|---|---|---|---|
| 2,818,137 | 12/1957 | Richmond et al. | 95/143 |
| 3,037,338 | 6/1962 | Thomas | 95/143 X |
| 3,061,654 | 10/1962 | Gensheimer et al. | 95/144 X |
| 3,266,262 | 8/1966 | Moragne | 62/54 |
| 3,675,392 | 7/1972 | Reighter | 95/131 X |
| 3,713,272 | 1/1973 | Barrere, Jr. et al. | 95/143 X |
| 3,728,844 | 4/1973 | Snyder et al. | 95/143 X |
| 4,066,423 | 1/1978 | McGill et al. | 95/92 |
| 4,670,028 | 6/1987 | Kennedy | 95/146 X |
| 5,154,735 | 10/1992 | Dinsmore et al. | 95/146 X |
| 5,290,342 | 3/1994 | Wikman et al. | 95/106 X |
| 5,294,246 | 3/1994 | Gardner, Sr. | 95/146 X |
| 5,300,468 | 4/1994 | Senum et al. | 95/141 X |

FOREIGN PATENT DOCUMENTS

| | | | |
|---|---|---|---|
| 0919024 | 4/1982 | U.S.S.R. | 95/143 |

*Primary Examiner*—Robert Spitzer
*Attorney, Agent, or Firm*—King & Schickli

[57] ABSTRACT

A method is described for the preconditioning of an adsorbent, such as activated carbon, prior to charging the adsorbent into a reaction vessel of a vapor recovery system. The method includes the steps of (1) treating the adsorbent in order to establish in the adsorbent a residual heel of vapor of the type to be subsequently adsorbed in vapor recovery processing and (2) adding the treated and, therefore, preconditioned adsorbent to the reaction vessel of the vapor recovery system. In this way vapor recovery system downtime is significantly reduced.

5 Claims, 1 Drawing Sheet

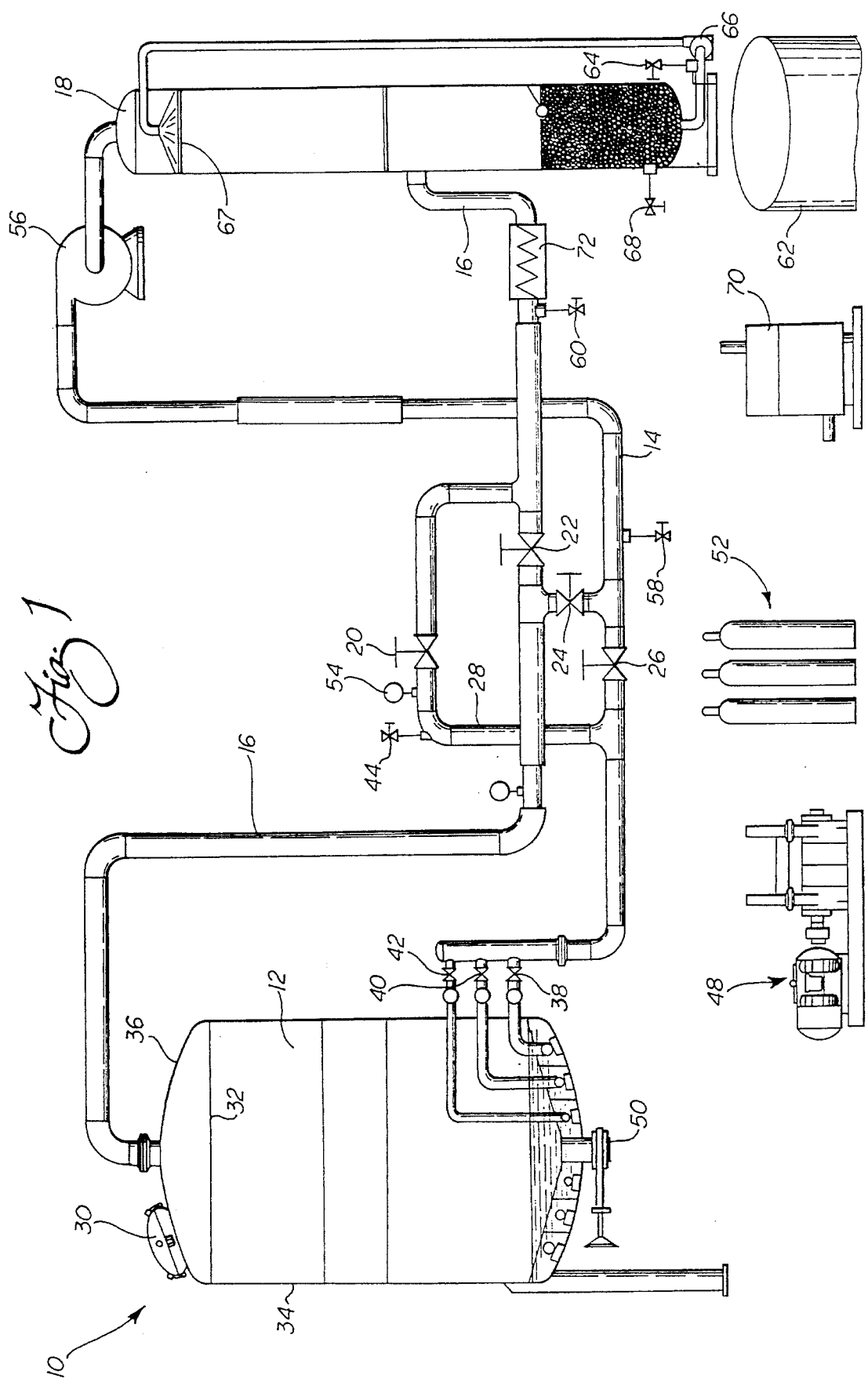

5,540,757

METHOD FOR PRECONDITIONING ADSORBENT

TECHNICAL FIELD

The present invention relates generally to the art of recovering volatile liquids from air-volatile liquid vapor mixtures and, more particularly, to a method for preconditioning an adsorbent for vapor recovery prior to charging a reaction vessel of a vapor recovery system with the adsorbent.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the removed volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these cryogenic refrigeration system shortcomings, alternative technology was sought and adsorption/absorption vapor recovery systems were more recently developed. One such system is disclosed in, for example, U.S. Pat. No. 4,066,423 to McGill et al. Such systems utilize a bed of solid adsorbent selected, for example, from silica gel, certain forms of porous mineral such as alumina and magnesia, and most preferably activated charcoal or carbon. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

During the adsorption process, the adsorbent increases significantly in temperature. This is due to the release of the heat of adsorption of hydrocarbon and also side exothermic reactions with impurities contained in the air-hydrocarbon vapor mixture being processed. As a result of these factors, undesired and potentially unsafe overheating may occur under certain operating conditions. In order to better prevent such overheating of the beds of adsorbent, it is well known to establish a residual heel of hydrocarbons in the adsorbent prior to conducting vapor recovery processing.

In the past, this "preconditioning" of the adsorbent has been completed "on-site" in the actual vapor recovery system. Specifically, new/clean adsorbent is charged into the reaction vessel. The reaction vessel is then sealed and a vacuum is established. Nitrogen is then delivered to the reaction vessel to provide an inert atmosphere and gasoline vapor and nitrogen are then circulated through the reaction vessel and, therefore, the adsorbent in the bed of the reaction vessel for an extended period of time. During this gasoline vapor-nitrogen circulation, the adsorbent heats up due to the release of the heat of adsorption. Once the desired heel is established, however, the adsorbent normally cools down to near ambient temperature. After the establishment of the residual heel is verified, the vapor recovery system is ready to be returned to normal field operation.

It, of course, should be appreciated that as this preconditioning process is performed the vapor recovery system is out of service. Accordingly, the system is unable to provide any emission control and, therefore, the terminal loading operation is also out of service. Due to the difficulty and uncertainty of preconditioning adsorbent, the preconditioning process generally takes at least 30 hours to complete and may even take up to one hundred hours in extreme conditions. As large loading terminal operations may generate revenue of up to $3 million per 24 hour period, it should be appreciated that any shut down for the preconditioning of the adsorbent leads to a substantial loss of revenue. Further, the rerouting or rescheduling of terminal loading activity through other terminal locations is troublesome, time consuming and costly. A need, therefore, is clearly identified for an improved method for changing the adsorbent in the reaction vessel beds of a vapor recovery system that significantly reduces the downtime of the vapor recovery system and, therefore, the downtime of the loading terminal.

SUMMARY OF THE INVENTION

Accordingly, it is a primary object of the present invention to provide a method for more quickly and efficiently changing or replacing the adsorbent in the beds of a vapor recovery system so as to substantially reduce system downtime and thereby minimize loss of revenue as well as scheduling and routing complications.

Stated another way, it is an object of the present invention to provide a method for the preconditioning of an adsorbent prior to the charging of a reaction vessel of a vapor recovery system with that adsorbent. Advantageously, such an approach significantly reduces vapor recovery system downtime while also allowing one to better predict total downtime for purposes of precise scheduling and routing.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a method is provided for preconditioning an adsorbent prior to charging a reaction vessel of a vapor recovery system with the adsorbent. Preferably, the method includes the steps of (1) treating the adsorbent to establish in the adsorbent a residual heel of vapor of the type to be adsorbed in subsequent vapor recovery processing and (2) adding the treated and, therefore, preconditioned adsorbent to the reaction vessel of the vapor recovery system. In this way, it is possible to ready the vapor recovery system for vapor recovery processing without any further "on-site" conditioning of the adsorbent. Accordingly, the vapor recovery system no longer is required to be shut down for 30 to 100 hours to condition the adsorbent. As a result, when changing adsorbent overall downtime of the vapor recovery system is significantly reduced. Advantageously, this leads directly to substantial revenue gains for the terminal operator.

More specifically describing the invention, the treating step includes the filling of an adsorber vessel with adsorbent, and then the sealing of the adsorber vessel. Next is the evacuating of the adsorber vessel to, for example, 27 inches of mercury vacuum. This is followed by the adding of nitrogen to the adsorber vessel and the circulating of a gasoline vapor and nitrogen mixture through the adsorber vessel and the adsorbent until a residual heel of vapor is established in the adsorbent. The fully preconditioned adsorbent is then removed from the adsorber vessel. It is stored in air tight and water tight vessels such as DOT drums in order to prevent contamination and loss of "conditioning". Thus, the adsorbent remains ready to be shipped to an end user. The preconditioned adsorbent is then simply added to the reaction vessel of the vapor recovery system which is then immediately ready for operation and terminal loading.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a side elevational schematic representation of a processing apparatus for the preconditioning of an adsorbent in accordance with the method of the present invention.

Reference will now be made in detail to the present preferred embodiment of the invention, an example of which is illustrated in the accompanying drawing.

DETAILED DESCRIPTION OF THE INVENTION

Reference is now made to FIG. 1 showing one form of apparatus 10 that maybe utilized to complete the method of the present invention for preconditioning adsorbent such as activated carbons or charcoal prior to the charging of a reaction vessel of a vapor recovery system with the adsorbent. As shown, the apparatus 10 includes an adsorber vessel 12 (e.g. 600 $ft^3$ capacity) connected via conduits 14 and 16 to a packed column absorber 18. A series of flow control valves 20, 22, 24, and 26 and a service conduit 28 allow the flow of fluid through the adsorber vessel 12 to be selectively reversed relative to the packed column absorber 18 as desired during preconditioning.

Referring now to the method of the present invention, the method includes the initial step of treating the adsorbent to establish in the adsorbent a residual heel of vapor of a type to be adsorbed in subsequent vapor recovery processing. In the method being described, activated carbon adsorbent is being treated with hydrocarbon vapor. It should be appreciated, however, that this adsorbent and vapor are selected for purposes of illustration only and this invention is not to be considered as limited thereto.

This treating is completed by first filling the adsorber treatment vessel 12 with the activated carbon. More specifically, the hatch 30 is opened and the adsorber vessel 12 is filled, for example, to the seam line 32 formed between the side wall 34 and head 36 (e.g. filled with approximately 11,000 lbs of activated carbon). The activated carbon is spread away from the fill hatch 30 and leveled as much as possible. The hatch 30 is then repositioned over the fill opening. As this is done, all activated carbon is removed from the flange around of the fill opening to insure that a good air tight seal is established.

At this point, the activated carbon has not been exposed to hydrocarbon vapor levels in any appreciable amounts. The initial saturation with hydrocarbon vapors is accomplished by utilizing recycled hydrocarbon vapors from the packed column absorber 18 in a nitrogen atmosphere. The inert nitrogen atmosphere is necessary to reduce the risk of overheating the bed of activated carbon and thereby minimize the hazards associated therewith. More specifically, during initial saturation heat is released rapidly during the adsorption of hydrocarbons on the new activated carbon. Thus, it should be appreciated that the temperature of the activated carbon in the adsorber vessel 12 is monitored closely during processing. The temperature rise occurs as a "wave front" as the hydrocarbon vapor adsorption zone works its way up through the bed of activated carbon. Temperatures as high as 200° F. are commonly observed along this wave front.

Following the filling and sealing of the adsorber vessel 12, is the step of evacuating the adsorber vessel. More specifically, the sparger valves 38, 40 and 42 and vacuum control valve 44 are all opened. The port of valve 44 is then connected to a vacuum pump 48. With the flow control valves 20, 22, 24 and 26 as well as adsorber vessel drain valve 50 all closed vacuum pump 48 is operated to establish a vacuum of, for example, 27 inches of mercury vacuum in the adsorber vessel 12. Once established, the vacuum control valve 44 is closed. The vacuum in the adsorber vessel 12 is then monitored for a short period of time to insure that there are no air leaks. If a leak is discovered, the leak is identified and a proper seal is established. The steps just described are then repeated to establish the 27 inches of mercury vacuum in the adsorber vessel 12.

Next is the adding of nitrogen to the adsorber vessel 12. More specifically, the port of control valve 44 is now connected to a source of nitrogen 52. A regulator on the nitrogen source 52 is set for 100–125 psig and the control valve 44 is opened. This allows nitrogen to begin to bleed into the adsorber vessel 12. The delivery of nitrogen to the adsorber vessel 12 continues through the control valve 44 until the vacuum gage 54 reads 0 vacuum (e.g. until approximately 650 ft$^3$ of nitrogen are delivered). The port of control valve 44 is then reconnected to the vacuum pump 48 and a vacuum is again drawn down to 27 inches of mercury vacuum in the adsorber vessel 12. Nitrogen is then reintroduced into the adsorber vessel 12 for a second time in the manner previously described until the vacuum gage 54 reads 0 vacuum. A 27 inches of mercury vacuum is then reestablished in the adsorber vessel 12 for a third time in the manner previously described. Nitrogen is then introduced into the adsorber vessel 12 for a third time also in the manner previously described until the vacuum gage 54 again reads 0 vacuum. At this time the control valve 44 is closed and this portion of the procedure for establishing an inert atmosphere in the adsorber vessel 12 is completed.

Now the blower 56 and packed column absorber 18 are purged by nitrogen to displace as much air as possible. Specifically, the nitrogen source 52 is connected to the port of valve 58 and valves 58 and 60 are opened so that nitrogen flows through the blower 56 and the packed column absorber 18. Once purging is completed, the valves 58 and 60 are closed.

Next, the packed column absorber 18 is filled with fresh gasoline to a pre-determined level (e.g. with approximately 100 gallons). Specifically, a source of gasoline 62 is connected to the port of valve 64: valve 64 being opened to allow the delivery of gasoline to the packed column absorber 18. When filling is completed, the valve 64 is closed.

Next, valves 22 and 26 are opened and blower 56 and gasoline pump 66 are activated and gasoline is sprayed into the packed column absorber 18 by means of the sprayer 67. As a result, gasoline vapors are circulated in a predominately inert nitrogen atmosphere from the packed column absorber 18 to the adsorber vessel 12 (and the activated carbon contained therein) and back again in a closed loop through the conduits 14, 16. This circulating step is continued for, approximately, 15 to 50 hours. During this time should the reid vapor pressure of the gasoline fall below a particular level (e.g. 8 RVP) it may be necessary to inject liquid butane into the lean gasoline in the packed column absorber 18. This is done through the port connected to the valve 68. As the gasoline vapor is circulated through the saturation loop from the packed column absorber 18 through the conduit 14, the adsorber vessel 12 and back through the conduit 16, vapor is adsorbed by the activated carbon in an adsorption zone that gradually rises upwardly in the adsorber vessel 12. The sparger valves 38, 40, 42 equally distribute the gas flow so that all the carbon is relatively equally preconditioned.

After the activated carbon is saturated with hydrocarbon, the activated carbon begins to cool. At this time, the direction of flow is reversed. This is accomplished by closing the valves 22 and 26 and opening the valves 20 and 24. Circulation of gasoline vapor is then continued in the reverse direction through the adsorber vessel 12 for 15 to 50 hours. At the end of 30–100 hours when all temperatures measured along the height of the adsorber vessel 12 are below 100° F. the blower pump 56 and gasoline pump 66 are deactivated and gasoline vapor circulation in the apparatus 10 is terminated.

Next, the hatch 30 of the adsorber vessel 12 is carefully opened to allow venting to atmosphere and a sample of preconditioned carbon is carefully removed from the adsorber vessel. This sample is weighted to insure that a proper gasoline heel has been established. If not, the nitrogen atmosphere is reestablished and the saturation loop just described (wherein gasoline vapor flows between the packed column absorber 18 and the adsorber vessel 12) is reinitiated until the proper heel weight has been established.

Once this is done, the next step in quality control is to purge the entire system with air and restart the saturation loop. If the carbon vessel temperatures remain steady, the saturation process is complete. If the temperatures do not remain below 100° F., the saturation loop is continued until all temperatures are again below 100° F.

After saturation is completed, valves 20, 22, 24 and 26 are closed and pump 66 and blower 56 are again deactivated. The carbon vessel fill hatch 30 is then opened. Further, the valve 60 may be open to atmosphere to alleviate any system pressure. Next, valve 50 is opened to drain the preconditioned activated carbon from the vessel 12. The preconditioned carbon may be collected in an air tight and water tight drum for shipping to the end user if desired.

Following shipping, is the adding of the treated and preconditioned activated carbon to the reaction vessel of the vapor recovery system of the customer. Advantageously, as a result of the off-site preconditioning process just described, the vapor recovery system is made substantially immediately ready for vapor recovery processing. No further preconditioning of the activated carbon needs to be completed "on-site" in the vapor recovery system as this has already been done. Consequently, the 30 to 100 hours normally necessary to complete this preconditioning are not required and the terminal loading facility equipped with the vapor recovery system may be put into service sooner without this substantial additional shut downtime. As a result, revenue losses due to downtime are significantly reduced.

It should further be appreciated that in some cases, the prior art approach of "on-site" conditioning of the activated carbon in the vapor recovery system can lead to further significant complications. For example, in certain situations, the activated carbon may not cool down properly so that gasoline loading may resume. In these instances, it may be necessary to flood the reaction vessel with water to achieve the required cooling. When this is done, the activated carbon cannot effectively adsorb hydrocarbons for up to six weeks. Therefore, the associated loading terminal is only able to operate out of EPA compliance and may possibly need to be shut down for the entire period. By preconditioning off-site in the manner described in the present invention, this potential problem is completely avoided.

In summary, numerous benefits result from employing the concepts of the present invention. The present method for preconditioning an adsorbent off-site in a controlled situation serves to significantly reduce the cost, downtime, and uncertainty associated with the prior art method of conditioning the carbon "on-site" after it is charged into the reaction vessel of the vapor recovery system. The end user is effectively provided with a large economic benefit as vapor recovery system downtime is reduced by up to 30–100 hours. Accordingly, 30 to 100 hours of revenue generation are restored to the terminal operator.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, an air cooler or chiller 70 may be used in combination with a heat exchanger 72 to remove heat from the nitrogen/gasoline vapor mixture circulating through the closed saturation loop during preconditioning of the activated carbon. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method is provided for preconditioning an adsorbent prior to charging a reaction vessel of a vapor recovery system with the adsorbent, said method comprising:

treating the adsorbent to establish in the adsorbent a residual heel of vapor of a type to be adsorbed in subsequent vapor recovery processing; and adding the treated and, therefore, preconditioned adsorbent to the reaction vessel of the vapor recovery system whereby the vapor recovery system is made ready for recovering vapor without any further conditioning of the adsorbent and overall downtime of the vapor recovery system is significantly reduced.

2. The method set forth in claim 1, further including shipping the treated and, therefore, preconditioned adsorbent to an end user.

3. The method set forth in claim 2, including storing the treated and preconditioned adsorbent in an air tight and water tight vessel prior to adding the adsorbent to the reaction vessel of said vapor recovery system.

4. The method set forth in claim 1, wherein said type of vapor to be adsorbed is gasoline vapor and said treating step includes filing an adsorber vessel with adsorbent, sealing the adsorber vessel, evacuating the adsorber vessel, adding nitrogen to the adsorber vessel and circulating gasoline vapor and nitrogen through the adsorber vessel and adsorbent.

5. The method set forth in claim 4, wherein said adsorbent is activated carbon.

* * * * *

UNITED STATES PATENT AND TRADEMARK OFFICE
CERTIFICATE OF CORRECTION

PATENT NO. : 5,540,757
DATED : July 30, 1996
INVENTOR(S) : John F. Jordan, Sr.

It is certified that error appears in the above-indentified patent and that said Letters Patent is hereby corrected as shown below:

In Claim 4, column 8, line 13, change "filing" to --filling--.

Signed and Sealed this

Twenty-ninth Day of October 1996

Attest:

BRUCE LEHMAN

*Attesting Officer*     Commissioner of Patents and Trademarks